Feb. 26, 1957  A. E. ROLLER  2,782,881
VEHICLE BRAKE
Filed April 13, 1954  2 Sheets-Sheet 1
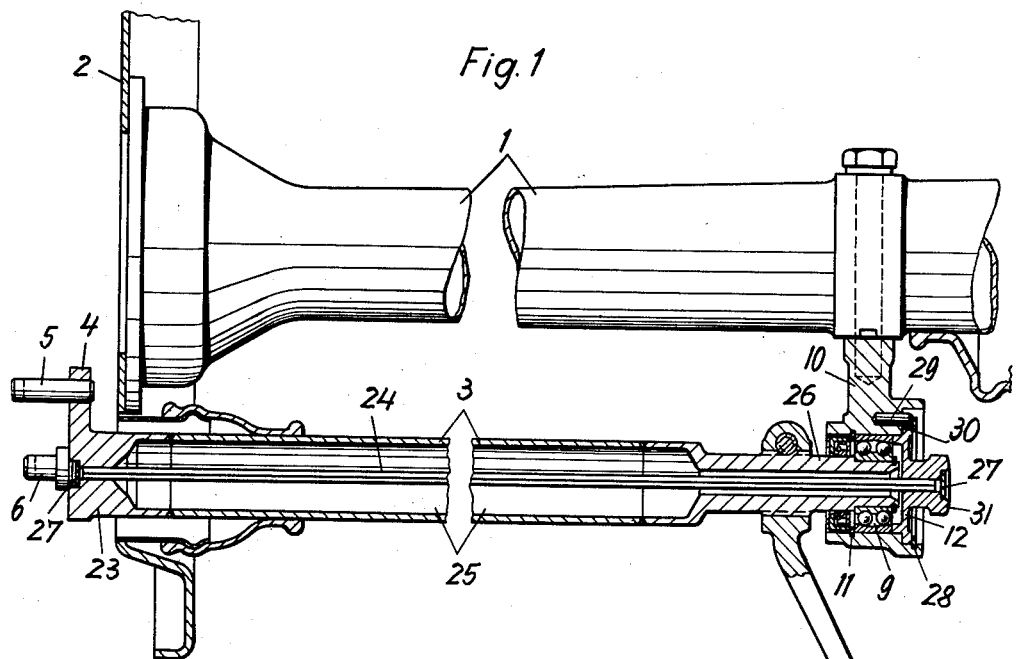
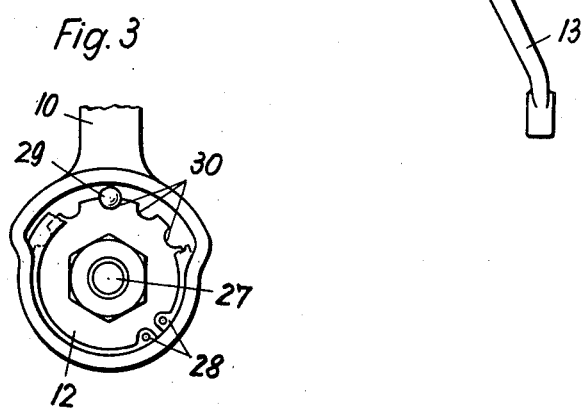
INVENTOR
ALBERT E. ROLLER
BY Dicke and Craig.
ATTORNEYS.

United States Patent Office 2,782,881
Patented Feb. 26, 1957

2,782,881
VEHICLE BRAKE

Albert E. Roller, Stuttgart, Germany, assignor to Daimler-Benz Aktiengesellschaft, Stuttgart-Unterturkheim, Germany Application April 13, 1954, Serial No. 422,954

Claims priority, application Germany April 17, 1953

8 Claims. (Cl. 188—216)

The present invention relates to improvements in hand brakes for motor vehicles, and more particularly it relates to a novel actuating mechanism for an internal brake.

The internal hand brakes as previously disclosed have the disadvantage that the retraction springs thereof are located within the brake drum, and that it is very difficult to mount them adequately within the confined space thereof which is largely taken up by the brake shoes. Such difficulty is enhanced if a hydraulic mechanism for operating the brake is also to be provided within such confined space. Also, such internal arrangement of the retraction springs makes it very hard to adjust them, requiring an experienced mechanic to do it at a considerable expense and waste of time.

It is the object of the present invention to devise a novel actuating mechanism for an internal brake which overcomes all of the above mentioned disadvantages by arranging the retraction spring outside of the brake drum, and it is the essential feature of the invention to mount and completely enclose such retraction spring within a hollow actuating shaft whereby the operation of the hand brake lever which is mounted thereon is transmitted to the brake mechanism within the brake drum.

Another feature of the invention is to provide a suitable bearing structure for such hollow shaft so that the latter is preferably mounted only adjacent the inner end thereof, such bearing being preferably mounted on a suitable bracket which is rigidly secured to the axle housing.

Another important feature of the invention is to provide the retraction spring in the shape of a torsion spring which at one end thereof is non-rotatably mounted within the outer, substantially solid end portion of the hollow actuating shaft, i. e. the end facing the brake, while the other end of such torsion spring slightly projects beyond the inner end of the hollow shaft near the point where the shaft is rotatably supported by its bearing, and extends into a suitable retaining plate which is non-rotatably secured thereto and mounted on the bracket extending from the axle housing. As an additional feature, such retaining plate may also be designed so as to cover and protect the adjacent bearing of the hollow shaft.

Another object of the invention is to provide the retraction spring to be easily removed and exchanged. Features for attaining this object consist in making the torsion spring throughout its length of the same angular cross section, mounting it within similarly shaped bearing points so as to be non-rotatable therein but permitting a slight movement in the axial direction thereof, and in merely providing a terminal plate at each end of the spring to close such bearing points and secure the spring against further axial movement.

Still another object of the invention is to provide simple means for adjusting the tension of the retracting spring, and a feature of the invention for accomplishing this object is to provide the retaining plate at the inner end of the torsion spring, which secures the spring against rotation and at the same time acts as a cover for the bearing of the hollow shaft, to be adjustable by permitting it to be turned together with the inner end of the spring to one of several positions and to be securely locked in such position with the spring then being under tension. At the inner end of the torsion spring, the terminal plate previously mentioned may either be formed by the retaining plate itself, which in such case may be closed toward the outside, or a separate terminal plate may be removably secured at either end of the torsion spring so as to retain the spring within its bearing points but permit it to be easily removed if a replacement thereof should be necessary.

Further objects, features, and advantages of the present invention will appear from the following detailed description thereof and the accompanying drawings, in which—

Fig. 1 shows a longitudinal cross section through the hollow shaft of the brake actuating mechanism and its associated elements with the hollow shaft in the position in which the retraction spring is released;

Figure 3 is an end view showing the plate 12 and adjusting mechanism for tensioning the spring.

Figure 2:
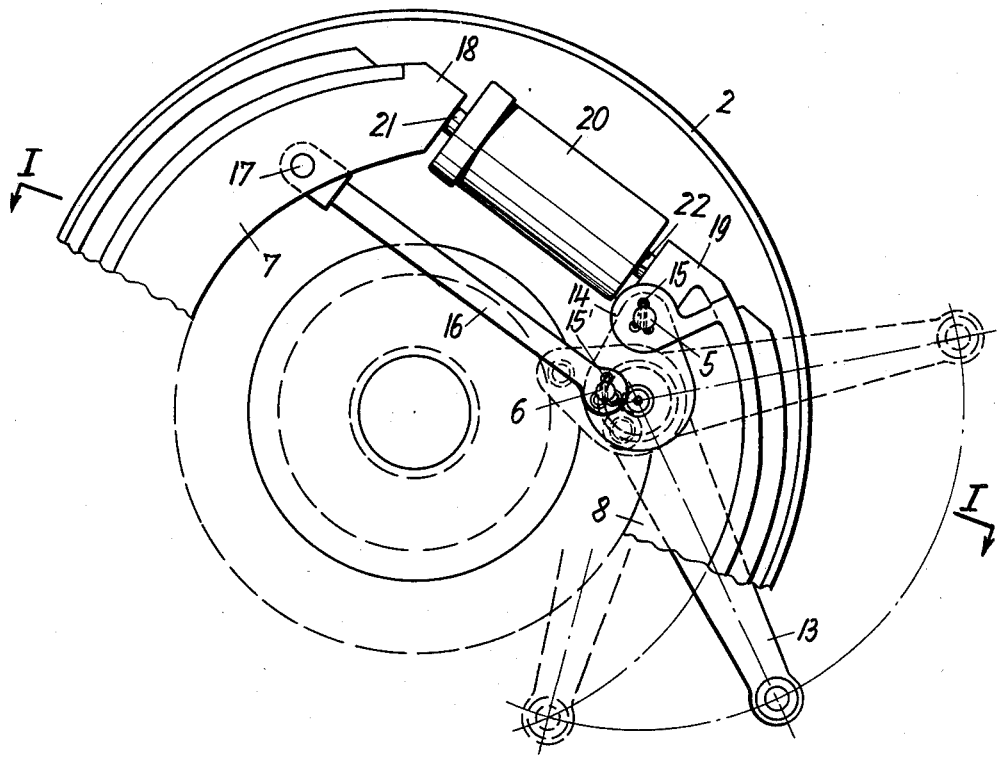
Fig. 2 shows a fractional end view of the brake mechanism as shown in Fig. 1 and showing additional elements not shown therein, the hollow shaft being illustrated in operative position with the retraction spring being under initial tension.

Referring to the drawings, the conventional housing 1 of an automobile axle has securely mounted thereon a cover plate 2 which protects the brake drum and the brake mechanism therein. A substantially hollow actuating shaft 3 extends parallel with the automobile axle from a point near the center thereof and passes through an aperture in the cover plate 2 to the inside of the brake drum so as to be rotatable therein. At the outer end, i. e. within the brake drum, the actuating shaft 3 terminates into an eccentric plate 4 which, in turn, carries eccentric actuating bolts 5 and 6 which are connected to the brake shoes 7 and 8.

As shown particularly in Fig. 1, the actuating shaft 3 passes rather loosely through the brake cover 2 and is rotatably supported only at the inner end thereof within a double or twin ball bearing 9 which is preferably mounted on a bracket 10 which is rigidly secured to the axle housing 1 near the center thereof. To prevent dirt from entering into the brake drum, suitable sealing means may be provided intermediate the shaft 3 and the cover 2. Also, for very long hollow shafts 3, an additional bearing may be added more closely to the outer end thereof and be supported by a bracket similar to bracket 10. By such twin bearing 9, the shaft 3 is also secured against shifting in the axial direction, the bearing, in turn, being prevented from axially shifting by a spring ring 11 at the outer side thereof and a retaining plate 12 at the inner side. For turning the shaft 3 to operate the brake, the shaft also carries near the bearing 9 an actuating lever 13 which, in turn, may be pivotally connected to the brake handle of the car in a conventional manner.

As shown in Fig. 2, the eccentric bolt 5 on the outer end of the shaft 3 is pivotally connected to the brake shoe 8 by means of a lug 14 near the outer end thereof, a cotter pin 15 or similar means preventing the brake shoe 8 from shifting in the axial direction of the bolt 5. The other eccentric bolt 6 is pivotally connected to one end of a connecting rod 16 which, in turn, is pivotally connected to the brake shoe 7 by a bolt 17. A cotter pin 15' secures the connecting rod 16 from axially shifting on the bolt 6.

For hydraulically operating the brake shoes, a brake cylinder 20 is provided above the connecting rod 16 and for this purpose contains a pair of pistons (not shown) which are connected by piston rods 21 and 22 to the ends 18 and 19 of the brake shoes 7 and 8, respectively.

Within the hollow shaft 3 and extending through the entire hollow space 25 thereof is a torsion spring 24 of uniformly angular, preferably square, cross section which is non-rotatably mounted within the substantially solid end portion 23 facing the brake and extends throughout shaft 3, projecting from the other end thereof into a plate 12, wherein it is likewise non-rotatably secured. Although the opposite ends of the torsion spring 24 are thus prevented from turning relative to the end 23 and the plate 12, it need not be rigidly mounted in the axial direction thereof and may have sufficient play within the corresponding square shaped apertures in the end 23 and the plate 12 to permit a certain axial movement therein which is limited by two end plates 27, which are secured to the end 23 and the plate 12 in a suitable manner to be easily removed. The plate 12, which is prevented from shifting in the axial direction by a spring ring 28, is also locked against rotation by a pin or screw 29 in the arm or bracket 10 which engages in an aperture 30 in the periphery of plate 12. By providing a series of such peripheral apertures 30 in the plate 12 immediately adjacent to the one shown in the drawing, the plate 12 may be adjusted in various positions for tightening the torsion spring 24 or changing its initial tension. Plate 12 is preferably provided with a hexagonal head 31 to permit such adjustment of the plate 12 and tensioning of the torsion spring 24 by means of a conventional wrench.

For removing and exchanging the torsion spring 24, the initial tension thereof should first be released by removing pin 29. Then, the terminal or end plates 27 may be removed, and a pin be inserted into the outer end of the shaft to push the spring 24 slightly inwardly until it can be grasped at its inner end and be withdrawn from the hollow shaft 3 and the plate 12. Thus, the spring 24 may be exchanged without removing the shaft or the plate 12. However, since the plate 12 is easily removed of the spring ring 28 after the pin 29 has been withdrawn and the initial tension of the spring is released, the two end plates 27 may not be required and the respective portions, i. e. the outer end of shaft 3 and the head 31 on the plate 12 may be solidly closed toward the outside. In such event, after plate 12 is withdrawn from the inner end of spring 24, it is merely necessary to grasp the end of the spring which projects from the shaft 3 and to withdraw the spring from the shaft.

While the foregoing description sets forth in detail what I regard as the preferred embodiment of my invention, it is to be understood that numerous changes may be made therein without departing from the scope of the invention as defined in the appended claims.

Having thus described my invention, what I claim as new is:

1. In combination with a vehicle having wheels and a hydraulically operated brake mechanism for said wheels including one internal brake for each of said wheels and adapted to act on said wheels, an additional hand brake mechanism for at least some of said wheels comprising one hollow shaft intermediate said wheels for each wheel included in the additional hand brake mechanism and connected to a corresponding one of said internal brakes, a spring within said hollow shaft, and means for turning said shaft to apply said brake and for simultaneously tensioning said spring so that, when said turning means are released, said spring retracts said brake and returns said shaft to its original position.

2. In combination with a vehicle having wheels and a hydraulically operated brake mechanism for said wheels including one internal brake for each of said wheels and adapted to act on said wheels, an additional hand brake mechanism for at least some of said wheels comprising one hollow shaft intermediate said wheels for each wheel included in the additional hand brake mechanism and connected to a corresponding one of said internal brakes, a torsion spring within said hollow shaft, and means for turning said shaft to apply said brake and for simultaneously twisting said spring so that, when said turning means are released, said spring retracts said brake and returns said shaft to its original position.

3. In combination with a vehicle having wheels and a hydraulically operated brake mechanism for said wheels including one internal brake for each of said wheels and adapted to act on said wheels, an additional hand brake mechanism for at least some of said wheels comprising one hollow shaft intermediate said wheels for each wheel included in the additional hand brake mechanism and connected to a corresponding one of said internal brakes, a torsion spring within said hollow shaft, the inner end of said spring projecting from the inner end of said shaft, means for rotatably supporting the inner end of said shaft, means for non-rotatably securing the outer end of said spring to the outer end of said shaft and the inner end of said spring to said supporting means, and means for turning said shaft to apply said brake and for simultaneously twisting said spring so that, when said turning means are released, said spring retracts said brake and returns said shaft to its original position.

4. In combination with a vehicle having wheels and a hydraulically operated brake mechanism for said wheels including one internal brake for each of said wheels and adapted to act on said wheels, an additional hand brake mechanism for at least some of said wheels comprising one hollow shaft intermediate said wheels for each wheel included in the additional hand brake mechanism and connected to a corresponding one of said internal brakes, a torsion spring of angular cross section within said hollow shaft, the inner end of said spring projecting from the inner end of said shaft, means for rotatably supporting the inner end of said shaft, means for securing the outer end of said spring to the outer end of said shaft and the inner end of said spring to said supporting means so as to prevent rotary movement of said outer spring end relative to said outer shaft end and of the inner spring end relative to said supporting means but permitting said spring to slide in the axial direction relative to said securing means, removable means at both ends of said spring for limiting axial movement of said spring within said shaft, and means for turning said shaft to apply said brake and for simultaneously twisting said spring so that, when said turning means are released, said spring retracts said brake and returns said shaft to its original position.

5. In combination with a vehicle having at least one axle with wheels thereon and a hydraulically operated brake mechanism for said wheels including one internal brake for each of said wheels and adapted to act on said wheels, an additional hand brake mechanism for said wheels comprising one hollow shaft intermediate said wheels for each wheel and connected to said brake, a torsion spring of angular cross section within said hollow shaft, a bearing for supporting the inner end of said shaft, means for mounting said bearing in a fixed position relative to said axle, means for securing the outer end of said spring non-rotatably to the outer end of said shaft, an element non-rotatably mounted on the inner end of said spring and covering said bearing at one side thereof, means for turning said element and for locking the same to said bearing mounting means in one of several positions so as to tighten said spring for initial tension thereof, and means for turning said shaft to apply said brake and for simultaneously twisting said spring so that, when said turning means are released, said spring retracts said brake and returns said shaft to its original position.

6. In combination with a vehicle having at least one axle with wheels thereon and a housing enclosing said axle, an internal brake comprising a brake drum, brake shoes within said brake drum, hydraulic means intermediate said brake shoes, a cover closing said brake drum, an aperture in said cover, a hollow shaft extending substantially parallel with said axle, the outer end of said shaft extending through said aperture into said brake drum, bearing means for rotatably supporting said shaft near the inner end thereof, a bracket mounted on said axle housing and supporting said bearing means, a torsion spring of angular cross section within said hollow shaft, the outer end of said spring being secured to the outer end of said shaft so as to be non-rotatable but axially slidable relative thereto, said spring projecting from the inner end of said shaft, an element covering the bearing means at one side thereof and being secured to the inner end of said bracket so as to be non-rotatable but axially slidable relative to said shaft, means for turning said element and for locking the same to said bracket in one of several positions so as to tighten said spring for initial tension thereof, means for limiting axial movement of said spring in either direction, eccentric elements on the outer end of said shaft within said brake drum, means for connecting said eccentric elements to said brake shoes, and a brake lever mounted on said shaft, whereby when said lever is turned in one direction, said shaft is likewise turned and such rotation is transmitted through said eccentric elements to said brake shoes to apply the same to said brake drum, and simultaneously said spring is twisted to provide the tension required to retract said brake shoes from said brake drum and return said shaft to its original position when said brake lever is released.

7. In combination with a vehicle having at least one axle with wheels thereon, a housing enclosing said axle, and a hydraulically-operated brake system for each wheel including a brake drum and brake shoes within said brake drum, a cover closing said brake drum, and an aperture in said cover, an additional hand brake for each wheel operatively connected with said brake shoes comprising a hollow shaft extending substantially parallel with said axle, the outer end of said shaft extending through said aperture into said brake drum, bearing means for rotatably supporting said shaft, means for securing said bearing means to said axle housing, a torsion spring within said hollow shaft, the outer end of said spring being secured to the outer end of said shaft so as to be non-rotatable relative thereto, said spring projecting from the inner end of said shaft, means for non-rotatably securing the projecting end of said spring to said securing means on said axle housing, eccentric means on the outer end of said shaft within said brake drum, means for connecting said eccentric means to said brake shoes, and a brake lever mounted on said shaft, whereby when said lever is turned in one direction, said shaft is turned to apply said brake shoes to said brake drum and simultaneously said spring is twisted to provide the tension required to retract said brake shoes when said brake lever is released.

8. In combination with a vehicle having at least one axle with wheels thereon, a housing enclosing said axle, and a hydraulically-operated brake system for each wheel including a brake drum and brake shoes within said brake drum, a cover closing said brake drum, and an aperture in said cover, an additional hand brake for each wheel operatively connected with said brake shoes comprising a hollow shaft extending substantially parallel with said axle, the outer end of said shaft extending through said aperture into said brake drum, bearing means for rotatably supporting said shaft, a bracket mounted on said axle housing and supporting said bearing means, a torsion spring within said hollow shaft, the outer end of said spring being secured to the outer end of said shaft so as to be non-rotatable relative thereto, said spring projecting from the inner end of said shaft, means for non-rotatably securing the projecting end of said spring to said bracket, eccentric elements on the outer end of said shaft within said brake drum, means for connecting said eccentric elements to said brake shoes, and a brake lever mounted on said shaft, whereby when said lever is turned in one direction, said shaft is likewise turned and such rotation is transmitted through said eccentric elements to said brake shoes to apply the same to said brake drum, and simultaneously said spring is twisted to provide the tension required to retract said brake shoes from said brake drum and return said shaft to its original position when said brake lever is released.

References Cited in the file of this patent
UNITED STATES PATENTS

| 1,810,022 | Link | June 16, 1931 |
| 1,992,117 | Bourdon | Feb. 19, 1935 |
| 2,030,272 | Schnell | Feb. 11, 1936 |
| 2,057,824 | Hard et al. | Oct. 20, 1936 |
| 2,181,316 | Etten | Nov. 28, 1939 |
| 2,480,934 | Julien | Sept. 6, 1949 |